(12) United States Patent
Viassolo et al.

(10) Patent No.: US 7,542,171 B2
(45) Date of Patent: Jun. 2, 2009

(54) SYSTEM AND METHOD FOR COMPENSATING FOR STREAKS IN IMAGES USING INTENSITY VARIATION OF RASTER OUTPUT SCANNER

(75) Inventors: Daniel E. Viassolo, Schenectady, NY (US); Howard A. Mizes, Pittsford, NY (US); Shawn P. Updegraff, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 932 days.

(21) Appl. No.: 10/872,922

(22) Filed: Jun. 21, 2004

(65) Prior Publication Data

US 2006/0001911 A1 Jan. 5, 2006

(51) Int. Cl.
*H04N 1/40* (2006.01)
*H04N 1/46* (2006.01)
*G06T 5/00* (2006.01)

(52) U.S. Cl. ............... 358/3.26; 358/3.24; 358/504; 358/518

(58) Field of Classification Search ............. 358/3.21, 358/3.24, 3.26, 406, 463, 504, 518
See application file for complete search history.

(56) References Cited

U.S. PATENT DOCUMENTS

| 5,081,536 | A | | 1/1992 | Tandon et al. |
| 5,105,277 | A | | 4/1992 | Hayes et al. |
| 5,148,268 | A | | 9/1992 | Tandon et al. |
| 5,165,074 | A | * | 11/1992 | Melino ............... 358/481 |
| 5,546,165 | A | | 8/1996 | Rushing et al. |
| 5,726,776 | A | * | 3/1998 | Auer et al. ............ 358/494 |
| 5,761,396 | A | * | 6/1998 | Austin et al. ......... 358/1.15 |
| 6,266,077 | B1 | * | 7/2001 | Kamimura ........... 347/236 |
| RE38,180 | E | * | 7/2003 | Edge .................... 347/19 |
| 2002/0075379 | A1 | | 6/2002 | Klassen |

* cited by examiner

*Primary Examiner*—James A Thompson
(74) *Attorney, Agent, or Firm*—Michael J. Nickerson; Basch & Nickerson LLP

(57) ABSTRACT

A method and system compensates for streak defects in an image formed using a raster output scanning device. A reflectance profile is generated from an image generated by the raster output scanning device. Thereafter, a difference profile is determined. The difference profile is determined based upon the generated reflectance profile and a uniform profile. A compensation profile is generated based on the determined difference profile. The compensation profile represents a change in an intensity profile for the raster output scanning device.

22 Claims, 9 Drawing Sheets

SYSTEM AND METHOD FOR COMPENSATING FOR STREAKS IN IMAGES USING INTENSITY VARIATION OF RASTER OUTPUT SCANNER

FIELD OF THE PRESENT INVENTION

The present invention relates to the field of digital imaging and, more particularly, to a system and method compensating for streaks and other image artifacts that appear on a printed image and which run parallel to the printer's process direction by using a raster output scanner as the compensation actuator.

BACKGROUND OF THE PRESENT INVENTION

Image reproduction systems provide a means to reproduce images in a variety of formats. An example of an image reproduction system is a xerographic ("dry writing") system. In this system, a latent image of electrical charges is formed on a photosensitive film. The location of the electrical charge forming the latent image is usually optically controlled. More specifically, in a digital xerographic system, the formation of the latent image is controlled by a raster output scanning device, usually a laser or LED source.

Although a xerographic system usually produces a faithful reproduction of the original image, defects in the subsystems of the xerographic may give rise to visible streaks in the reproduced image. Streaks are primarily one-dimensional defects in an image that run parallel to the process or slow-scan direction.

Streaks are caused by "non-ideal" responses of xerographic components in the marking engine. For example, these streaks may be caused by contamination of a wire module in a hybrid scavengeless development subsystem, contamination of a charging device or grid, scratches in the photoreceptor, differential abrasions of the photoreceptor, and raster output scanning device spot-size or intensity variations.

In a uniform patch of gray, streaks may appear as a variation in the gray level. In general, "gray" refers to the intensity value of any single color separation layer, whether the toner is black, cyan, magenta, yellow, or some other color.

Another frequent source of streaks is the non-uniformity of the raster output scanning device itself. This non-uniformity occurs because of problems in meeting the tight requirements of the manufacturing process and decreases the yield of raster output scanning device's meeting specifications.

As shown in FIG. 1, a measured L* profile in the fast-scan direction decreases in L* on the left and right side of the print, mainly due to the non-uniformity of the raster output scanning device. The dotted line 1 in FIG. 1 represents the desired measured L* or uniformity. The solid line 2 represents the actual measured L*. In this instance, the measured L* has non-uniformities which are the source of streaks in the rendered image.

In a color xerographic machine, this undesirable response of line 2 of FIG. 1 may cause visible color non-uniformities. The visible color non-uniformities are low spatial frequency streaks in the separations that although unobjectionable for a single color separation, may cause an undesirable color shift for overlaid colors.

Color uniformity requirements are usually tough to meet, and traditional solution approaches, as is noted below, rely on expensive parts or subsystems that meet tight allocations.

Most of the existing methods to mitigate streaks are "passive;" i.e., the methods require using subsystem components of high quality with tight latitudes over the critical parameters. For example, the requirement could be a softer toner with low abrasion, a better coating for the hybrid scavengeless developer wire, a more accurate optical system for the raster output scanning device, etc.

As a result of these passive approaches, manufacturing and maintenance costs for xerographic products increase dramatically in order to cope with more stringent image quality requirements. In addition, the reliability decreases as these subsystem components fail over time.

Therefore, it is desirable to provide a system and/or method that mitigate the streaks parallel to the process direction without using subsystem components of high quality with tight latitudes over the critical parameters. Moreover, it is desirable to provide a system and/or method that mitigate the streaks parallel to the process direction without increasing manufacturing or maintenance costs.

It is further desirable to provide a system and/or method that mitigate the streaks parallel to the process direction that utilizes the raster output scanning device as the actuator to compensate for streaks. It is also desirable to a system and/or method that mitigate the streaks parallel to the process direction that not only improves uniformity for a given halftone and/or area coverage, but improves the uniformity over a set of halftones and/or area coverages of interest.

SUMMARY OF THE PRESENT INVENTION

One aspect of the present invention is a method for compensating for streak defects in an image formed using a raster output scanning device. The method generates a reflectance profile from an image generated by the raster output scanning device; determines a difference profile based upon the generated reflectance profile and a uniform profile; and generates a compensation parameter based on the determined difference profile, the compensation parameter representing a change in the spatial dependence of an intensity setting profile for the raster output scanning device.

A second aspect of the present invention is a method for forming an image using a raster output scanning device. The method controls, to compensate for non-uniformities, illumination intensity from the raster output scanning device as a function of fast-scan position across the image.

A third aspect of the present invention is a method for compensating for non-uniformities in an image formed using a raster output scanning device. The method generates a plurality of reflectance profiles from an image generated by the raster output scanning device, the image generated by the raster output scanning device being a printed target pattern having a plurality of nominally uniform solid strips, each strip representing a predetermined area coverage, each reflectance profile corresponding to a predetermined area coverage; determines a plurality of difference profiles based upon the generated reflectance profiles and uniform profiles; and generates a compensation parameter based on the determined difference profiles, the compensation parameter representing a change in an intensity setting profile in the raster output scanning device.

A fourth aspect of the present invention is a system for compensating for streak defects in an image formed using a raster output scanning device. The system includes a scanner to generate a reflectance profile from an image generated by the raster output scanning device and a controller to determine a difference profile based upon said generated reflectance profile and a uniform profile and to generate a compensation parameter based on the determined difference profile. The compensation parameter represents a change in an intensity setting profile for the raster output scanning device.

A fifth aspect of the present invention is a raster output scanning device. The raster output scanning device includes a raster output scanning device controller to change, to compensate for non-uniformities, illumination intensity from the raster output scanning device as a function of fast-scan position across the image.

A sixth aspect of the present invention is a system for compensating for non-uniformities in an image formed using a raster output scanning device. The system includes a scanner to generate a plurality of reflectance profiles from an image generated by the raster output scanning device, the image generated by the raster output scanning device being a printed target pattern having a plurality of nominally uniform solid strips, each strip representing a predetermined area coverage, each reflectance profile corresponding to a predetermined area coverage, and a controller to determine a plurality of difference profiles based upon the generated reflectance profiles and uniform profiles and to generate a compensation parameter based on the determined difference profiles. The compensation parameter represents a change in an intensity setting profile in the raster output scanning device.

A seventh aspect of the present invention is a system for compensating for streak defects in an image formed using a raster output scanning device. The system includes means for generating a reflectance profile from an image generated by the raster output scanning device; means for determining a difference profile based upon said generated reflectance profile and a uniform profile; and means for generating a compensation parameter based on the determined difference profile. The compensation parameter represents a change in an intensity setting profile for the raster output scanning device.

A further aspect of the present invention is a system for compensating for non-uniformities in an image formed using a raster output scanning device. The system includes means for generating a plurality of reflectance profiles from an image generated by the raster output scanning device, the image generated by the raster output scanning device being a printed target pattern having a plurality of nominally uniform solid strips, each strip representing a predetermined area coverage, each reflectance profile corresponding to a predetermined area coverage; means for determining a plurality of difference profiles based upon the generated reflectance profiles and uniform profiles; and means for generating a compensation parameter based on the determined difference profiles. The compensation parameter represents a change in an intensity setting profile in the raster output scanning device.

BRIEF DESCRIPTION OF THE DRAWINGS

The present invention may take form in various components and arrangements of components, and in various steps and arrangements of steps. The drawings are only for purposes of illustrating a preferred embodiment or embodiments and are not to be construed as limiting the present invention, wherein.

DETAILED DESCRIPTION OF THE PRESENT INVENTION

Figure 1:
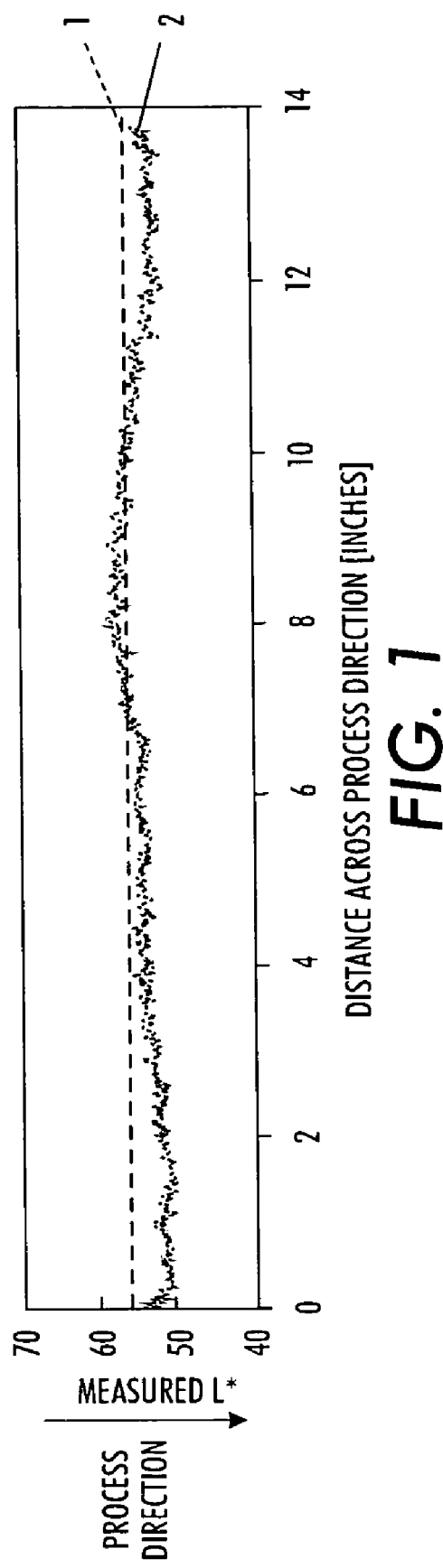
FIG. 1 illustrates an example of a measured luminance reflectance profile in a fast-scan direction for a particular color separation.

The present invention will be described in connection with specific embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

In the various descriptions given above and below, the term fast-scan direction or cross-process direction refers to the direction that the illumination tracks to form a single scanline of the latent image. The fast-scan direction or cross-process direction is typically a single line of multiple pixels. On the other hand, the term slow-scan direction or process direction refers to the direction that the photoreceptor or image source relatively tracks to form multiple scanlines of the latent image.

The compensation technique described herein can be applied to both color and monochrome image forming devices.

Color monochrome image forming devices operate by overlaying different color separation layers. Each color separation layer is individually compensated for using the techniques described herein.

An input reflectance level is typically an integer between 0 and 255 that is sent to the marking engine from a computer, an input scanner, or other image data source. An actual reflectance level is the response of a sensor or scanner measuring the luminance level of the printed image. The actual reflectance level can be a function of distance in the cross-process or fast-scan direction. The desired or target reflectance level for each strip is defined as the mean response of each strip.

As noted above, FIG. 1 shows a measured L* profile in the fast-scan direction decreases in L* on the left and right side of the print, mainly due to the non-uniformity of the raster output scanning device. In a color xerographic machine, this undesirable response may cause visible color non-uniformities. The visible color non-uniformities are low spatial frequency streaks in the separations that translate into a cross process dependent color.

To compensate for the streaks or non-uniformities, the present invention provides an active solution that is centered upon controlling the intensity of the illumination source of a raster output scanning device; e.g., the laser's intensity; as a function of the fast-scan position across the page. The controlling of the intensity, as will be discussed in more detail below, compensates for streaks or non-uniformities.

Figure 4:
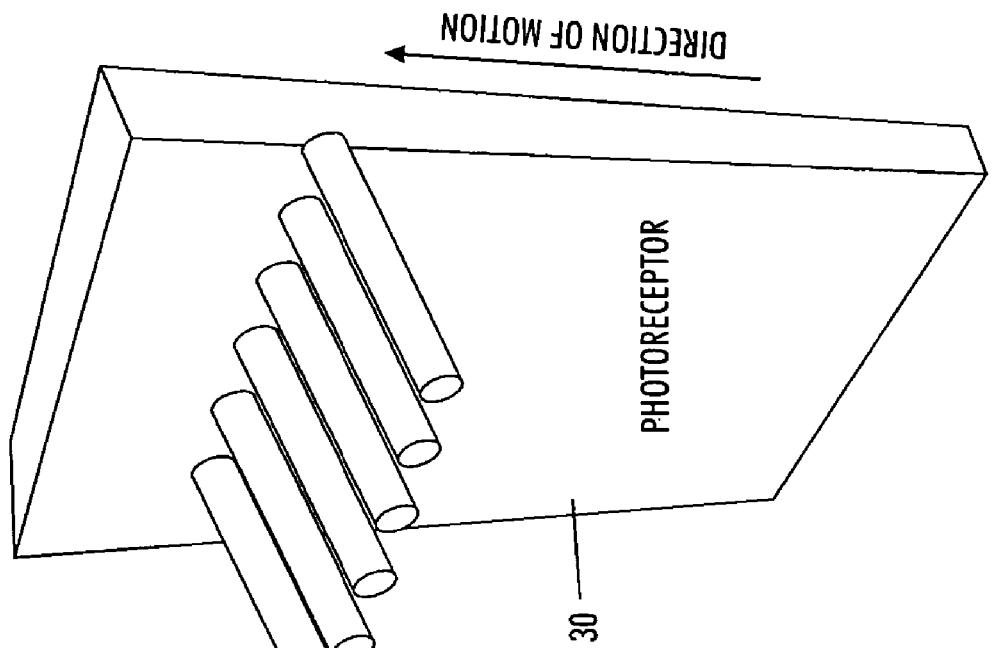
FIG. 4 illustrates a prior art raster output scanning system.
Figure 4:
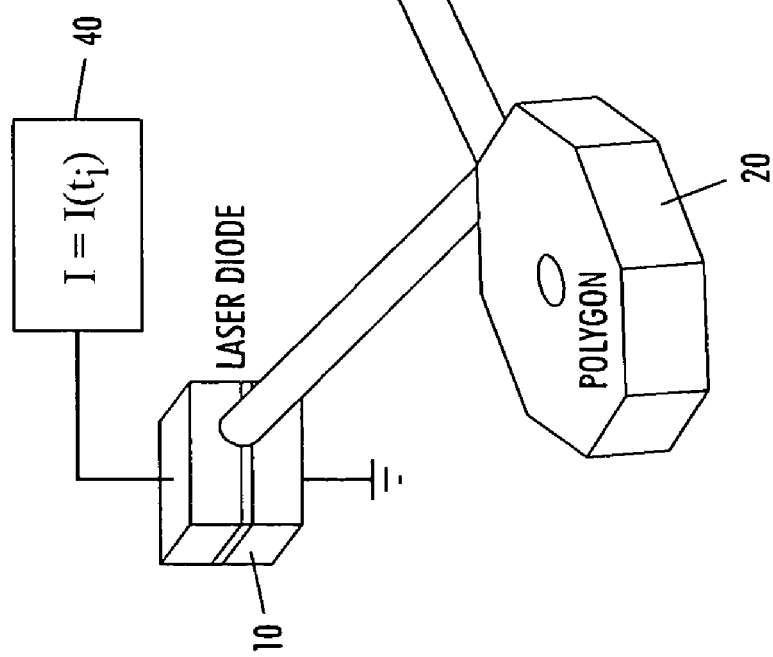

An example of a typical raster output scanning device to which the present invention is directed is illustrated in FIG. 4.

As illustrated in FIG. 4, a laser or illumination source 10 provides a light beam of a predetermined intensity. In this example, the intensity of the laser light is controlled by the drive current I generated by a laser driver or driving circuit 40. The light impinges upon a rotating polygonal mirror 20 which provides the scanning of the light across a photoreceptor 30 to form a single scanline of a latent image.

It is noted that although the present invention is described with respect to a single laser source or a single scanline is rendered per fast-scan period, the present invention is also readily applicable to a device having multiple beams so as to produce parallel scanlines simultaneously during a fast-scan period. A fast-scan period is the period of time for the light to traverse, a single time, across the photoreceptor in the fast-scan direction.

It is further noted that although FIG. 4 illustrates a single light beam, the light beam is in fact being tuned on and off at a rapid rate to write a halftoned latent image.

With respect to the laser driver or driving circuit 40, the intensity of the laser can be varied by changing current values in a look-up table wherein these current values are associated with certain intensity that will change the reflectance of a halftoned strip.

The present invention utilizes such capabilities to change the associated current value for a reflectance value to compensate for the streaks and non-uniformities. In other words, the present invention provides corrections to the look-up table so that the current value driving the laser intensity produces the correct or desired reflectance profile in the reproduced image. This correction process will be explained in more detail below.

The present invention selects appropriate intensity correction through a procedure composed of three basic steps: (1) Measuring the spatial non-uniformity in the fast-scan direction (i.e., measure the streaks); (2) Processing the measured data to determine the intensity changes that would improve uniformity; and (3) updating or compensating the intensity profile in the lookup table.

In a preferred embodiment of the present invention, the above described steps are performed in an iterative fashion (closed-loop control). The iterations are stopped once a target uniformity level is reached.

Figure 5:
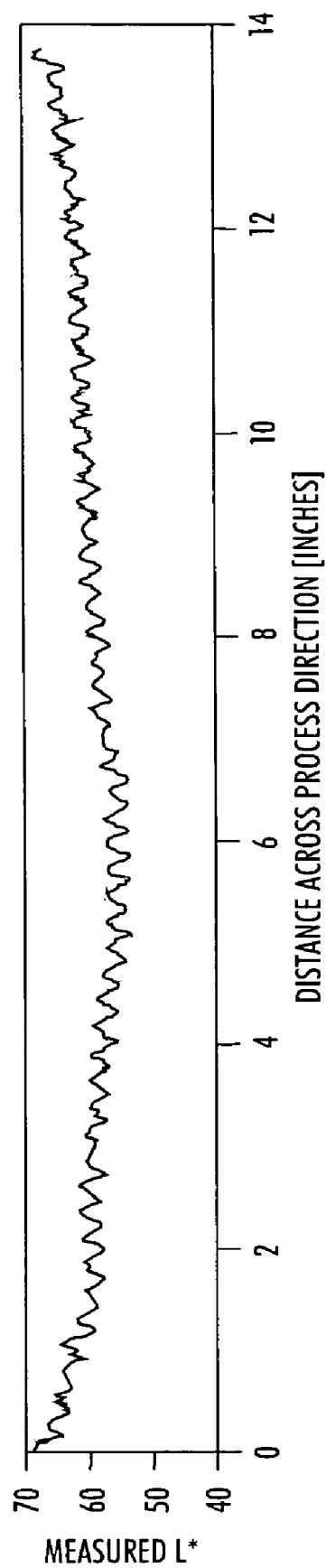
FIGS. 5 and 6 illustrate the scanned reflectance profiles for two intensity profiles from the raster output scanning device to sensor for a given separation and area coverage.
Figure 6:
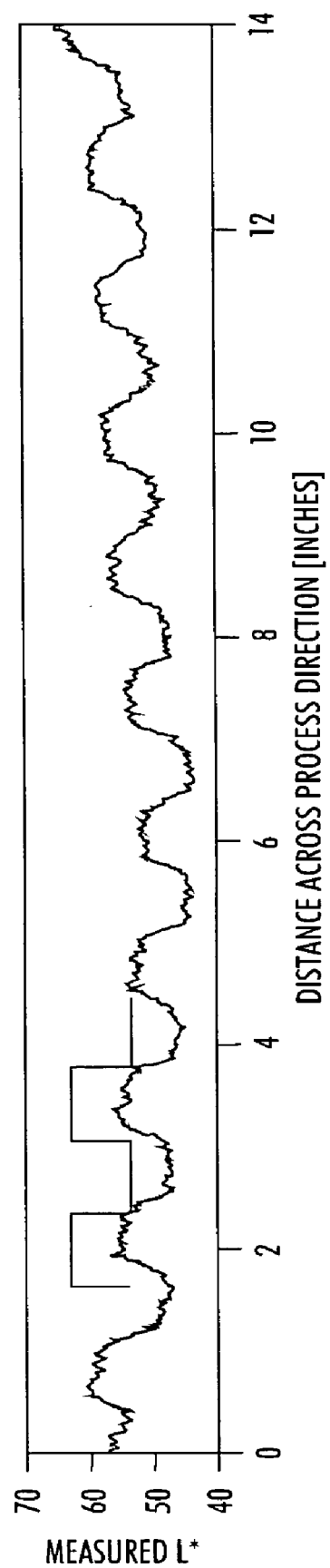

Before implementing the present invention, it is desirable to obtain or derive a model describing the print density response to changes in laser intensity. To compute the rules for updating the intensity settings, the present invention relies upon model-based control techniques. Hence, the present invention utilizes a model (a "simple" or control-oriented model) of the "system to be controlled"; i.e., a model describing how print density varies in response to changes in intensity settings An example of the modeling is illustrated in FIGS. 5 and 6. FIGS. 5 and 6 show reflectance in response to low and high frequency square waves with respect to the intensity settings of the laser utilized in the raster output scanning device. In addition to non-uniformities, the system has dynamics or, in other words, the laser intensity does not respond "instantaneously" to changes in the laser current's setpoints. This finite response time is the reason for the output signal to lag the input signal in FIGS. 5 and 6 (a portion of the input is shown in the lower plot), and the reason for having oscillations with much smaller amplitude for high frequency inputs than for low frequency inputs (the system acts as a low-pass filter). These dynamics are from inductances/capacitances in the diode driver circuit 40 of FIG. 4

In this modeling, U(k) denotes the vector of all laser intensity settings of the laser utilized in the raster output scanning device corresponding to the control iteration number k, and Y(k) denotes the vector of measured reflectances in response to U(k). Both U and Y have dimension N, where N is the number of intensity levels that can be controlled across the process.

A simple model relating U and Y is given by $Y(k)=G*U(k)+Y_0$ where G is a constant N×N matrix, and $Y_0$ is the N×1 reflectance vector for U=0. Due to the dynamics of the laser utilized in the raster output scanning device, the $j^{th}$ component of Y(k) depends not only on the on the $j^{th}$ component of U(k) but also on a few other preceding components, say: j-1, j-2, . . . .

In other words, the matrix G is lower-triangular (all elements above its diagonal are zero). In some cases, the dynamics of the laser utilized in the raster output scanning device can be neglected; i.e., off-diagonal entries of G are assumed zero.

It is noted that for a given pair of parameter matrices $G, Y_0$ is valid only for a given area coverage and halftone. When either area coverage or halftone is changed, the matrices $G, Y_0$ change.

It should be clear that the model parameters G need to be identified. Identification of $Y_0$ is not needed because only changes of Y due to changes in U are of interest, and this is given by the "sensitivity matrix" G.

The "sensitivities" can be estimated from a single print; for example, by introducing a square wave signal onto the raster output scanning device intensity profile (with the semi-period of the square wave being longer than the response time of the raster output scanning device).

For each strip in the test pattern, as will be described in more detail below, the amplitude of the print density change at the frequency of the introduced intensity change is calculated from a scan of the test pattern. The profile of the change in print density as a function of position is not a perfect square wave, but has blurred edges due to the finite response time of the laser utilized in the raster output scanning device. The sensitivity matrix G can be extracted from this profile using well-known techniques, such as prediction error methods.

Once a model is realized, the concepts of the present invention can be readily implemented so as to compensate for streaks and non-uniformities. As noted above, the first operation or function carried out by the present invention is to measure the spatial non-uniformity (streaking) in the fast-scan direction.

To measure the spatial non-uniformity (streaking) in the fast-scan direction, the present invention uses a print target consisting of nominally uniform solid strips formed or rendered in the cross-process or fast-scan direction. For example, a print target may consist of a set of patterns having 32 strips, with 8 different digital area coverages for each one of four color separations (cyan, magenta, yellow, and black). When using such a print target, the target monitors streaks for the four color separations simultaneously. The test patterns are designed and processed in a way to give an accurate profile of the uniformity.

It is further noted that fiducial marks in between strips may be used to compensate for scanner and/or printer non-uniformities. Moreover, it is noted that distributed aperture filtering may be used to eliminate the halftone structure while maintaining the high spatial resolution.

Figure 2:
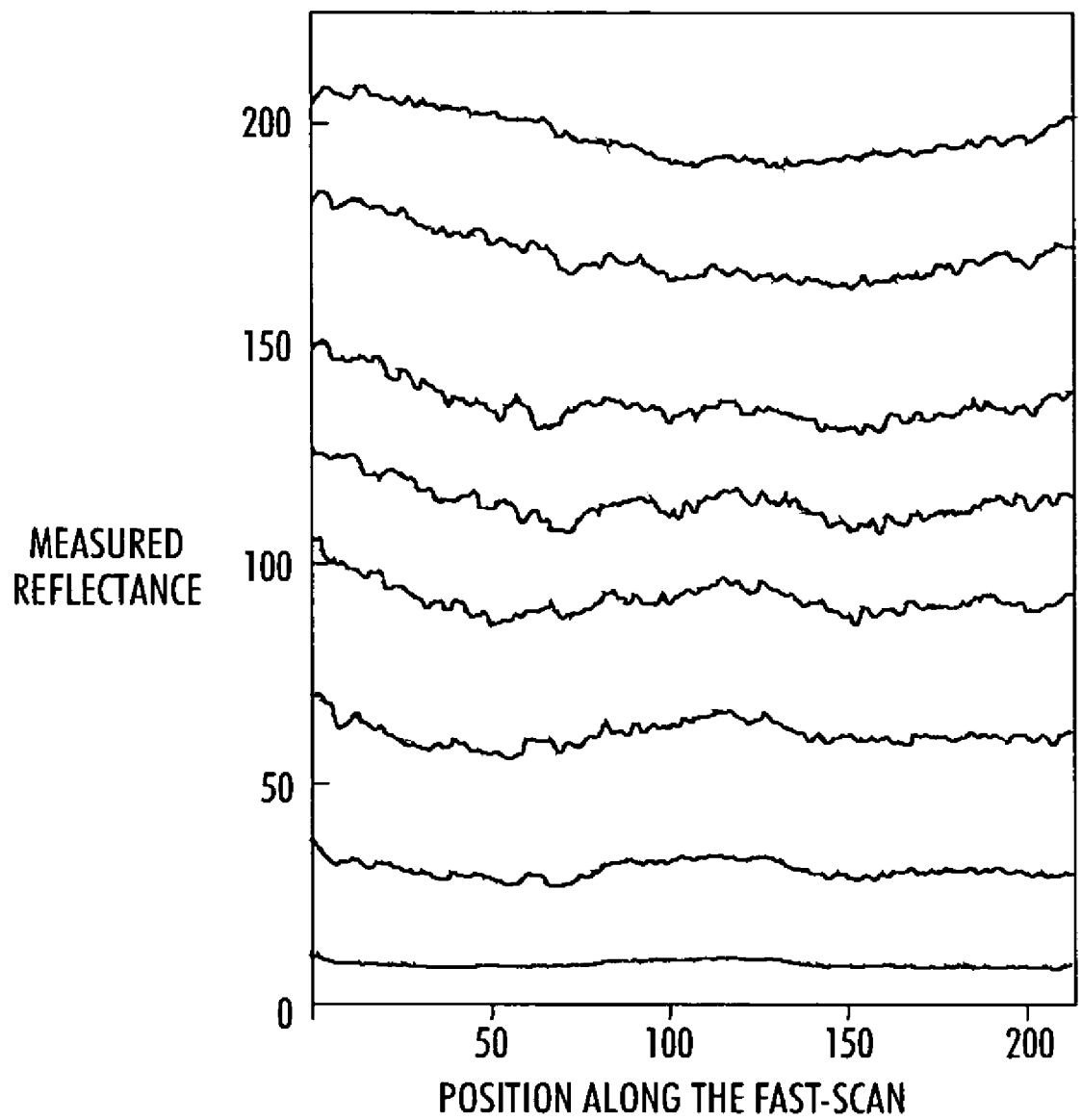
FIG. 2 illustrates the scanned reflectance profiles for eight different area coverage levels as a function of cross process position.
Figure 3:
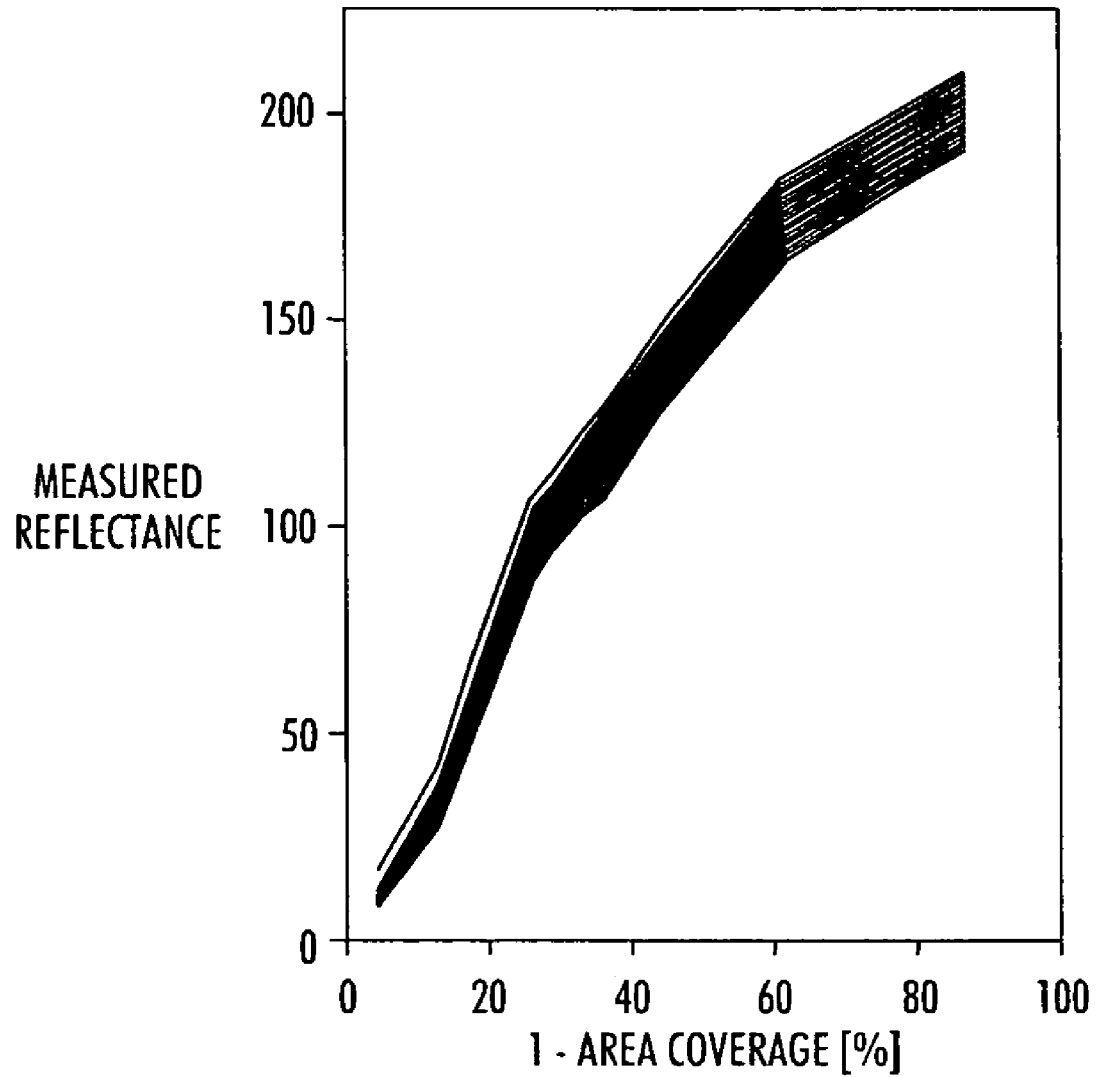
FIG. 3 illustrates the corresponding tone-reproduction curves for each fast-scan position of FIG. 2.

The reflectance profiles from the printed pattern are measured with an offline scanner, spectrophotometer, or an inline full width array sensor. An example of reflectance profiles is illustrated in FIG. 2 wherein FIG. 2 shows scanned reflectances for a pattern like the one described above (eight strips, but the black separation only). In these reflectance profiles, low and high spatial frequency streaks can be seen. The reflectance profiles can be displayed from a different point of view in FIG. 3. As shown in FIG. 3, the tone reproduction curves of the scanned pattern is illustrated. If there was perfect uniformity (no streaks), all eight lines in FIG. 2 would be flat and all tone reproduction curves in FIG. 3 would collapse into one single tone reproduction curve.

Upon obtaining the reflectance profiles from the printed pattern, the present invention processes the measured data to compute updates to the intensity settings for the laser being utilized in the raster output scanning device. In other words, the present invention changes the intensity settings for the laser being utilized in the raster output scanning device across the fast-scan direction to thus compensate for streaks so as to achieve uniform reflectance.

The exposure control on the laser being utilized in the raster output scanning device may have a significant response time. If this time is a small fraction of the traversal time across the photoreceptor, the streak compensation can be achieved. For any given print engine, the digital controller allows a predetermined number of independent exposures to be written to the laser being utilized in the raster output scanning device. This gives a resolution, which places an upper limit on the streak spatial frequencies that can be compensated for with this actuator.

In accordance with the concepts of the present invention, many different "control strategies" can be used for updating the intensity settings for the laser being utilized in the raster output scanning device. However, to better explain the overall concept, a generic approach is described below.

In compensating for these streaks, it is desirable to select $U(k)$ to make $Y(k)$ uniform, and thus the concepts of the present invention causes $Y(k)$ to converge to a given reference reflectance vector R (all components of R being equal a constant r).

Xerographic printers may have a separate control loop to maintain the reference reflectance values. For the spatial profile control loop to operate independently of the other loop, the reference reflectance vector can be taken as the mean of the profile of each strip. The "mean" of each strip is unknown to the other controller. Actually, to minimize interaction the reflectance reference for each strip is the value of that strip at the position of the other control loop's sensing.

Figure 7:
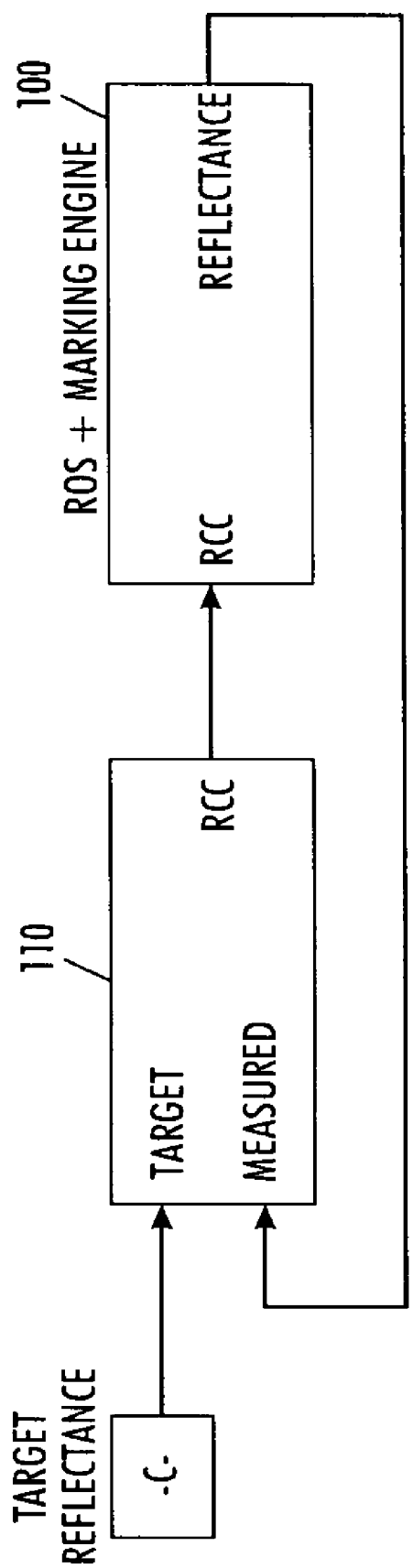
FIG. 7 illustrate a closed-loop compensation circuit according to the concepts of the present invention.
Figure 8:
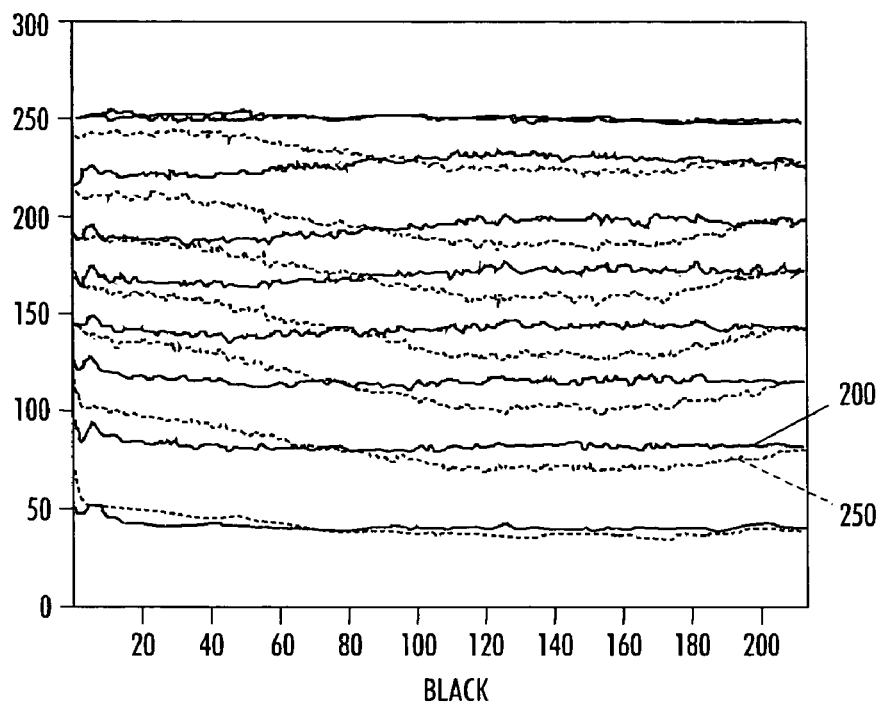
FIGS. 8-11 illustrate before and after results using the multi-objective compensation for eight area coverages for four separations according to the concepts of the present invention.
Figure 9:
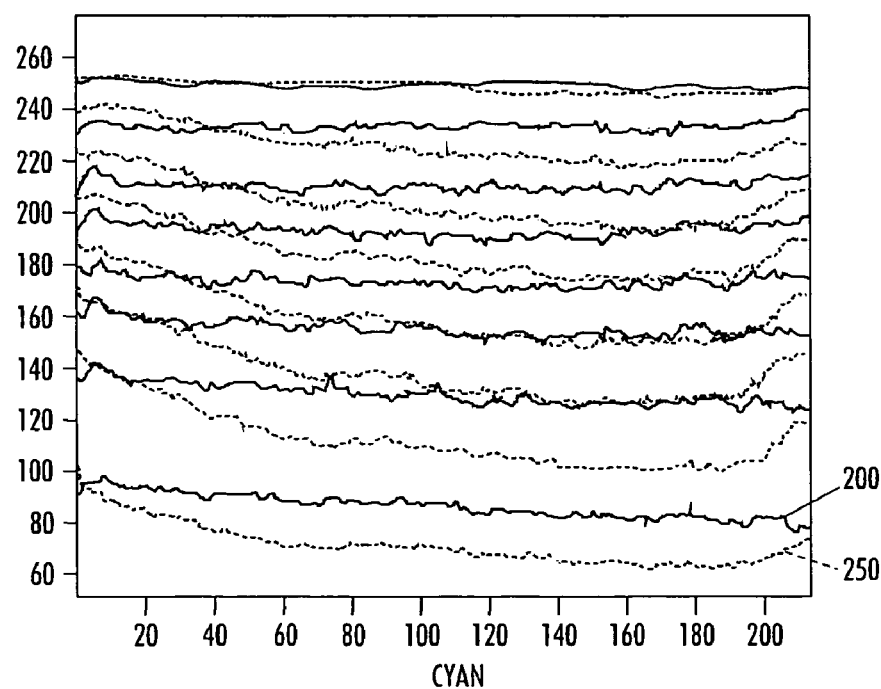
Figure 10:
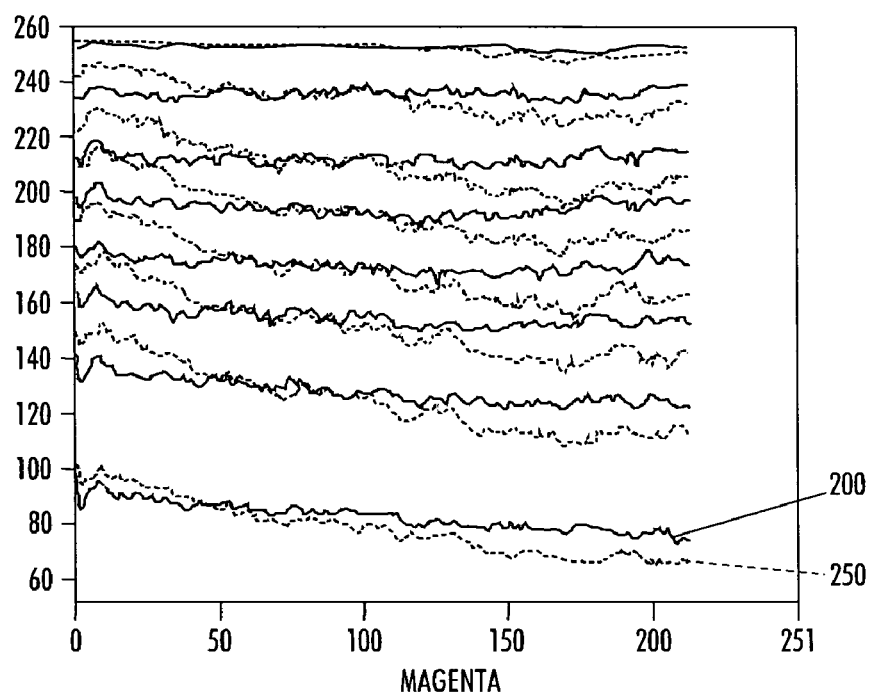
Figure 11:
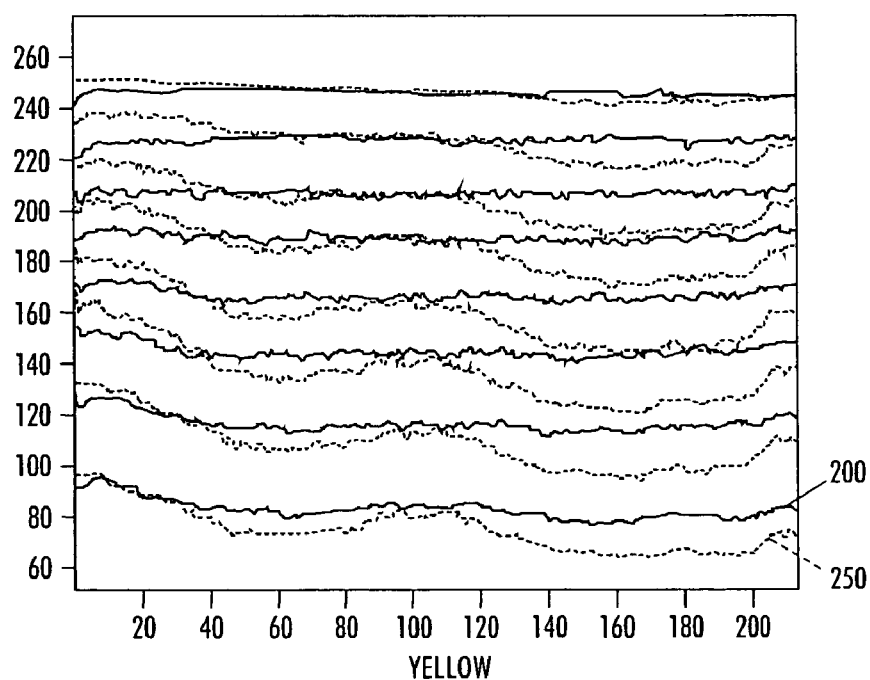

Such a control scheme is shown in FIG. 7, where the error at each iteration, $E(k)=R-Y(k)$, is processed to determine the next update to the intensity settings for the laser being utilized in the raster output scanning device $U(k+1)$.

As illustrated in FIG. 7, a controller 110 receives the target reflectance values or target reflectance profile as well as the measured reflectance values or profile. The controller 110 processes these inputs to determine correction values for the intensity settings for the laser being utilized in the raster output scanning device. The corrected intensity settings for the laser being utilized in the raster output scanning device are fed to a print engine 100 having a raster output scanning device and a marking engine to render another target print having certain reflectance values. In the iterative process, the reflectance is re-measured and fed to the controller 110 to effectuate the desired convergence. The process is repeated until the measured reflectance profile or values are within a predetermined range of the desired uniformity.

In a preferred embodiment the controller is a multi-input multi-output controller that has a number of inputs corresponding to the predetermined number of independent exposures to be written to the laser being utilized in the raster output scanning device and a number of outputs corresponding to the predetermined number of independent exposures to be written to the laser being utilized in the raster output scanning device. Any multi-input multi-output controller providing convergence of Y to R after a low number of iterations can be used in conjunction with the present invention.

For example, by adding an integrator to the error $E(k)$, and use linear quadratic regulator techniques to compute the state feedback matrix K guarantees acceptable levels of performance and robustness. In this case, $U(k+1)=U(k)+K*E(k)$.

If the system's dimension increases, common multi-input multi-output controller design methods will face numerical limitations and more sophisticated techniques will be needed; e.g., techniques for control of large-scale systems. In such a situation, the present invention can neglect the off-diagonal entries of G (and thus consider G as a diagonal matrix), allowing the present invention to use a simpler single-input single-output controller.

Once the corrections are determined, the corrected intensity settings can be uploaded to the raster output scanning device's driver. These settings cannot take any value as they have a given precision and cannot exceed a given range as saturation or clipping may occur. This limitation in the settings should be taken into account at the controller design stage (e.g., penalizing control signal sizes to avoid frequent saturations).

As stated before, measurement and xerographic noises motivate the need for an iterative process with respect to measuring, processing, and uploading the corrections. These iterations can be stopped as soon as the uniformity metrics achieve their target levels. For example, a (very rough) measure of uniformity could be the standard deviation of the error $E(k)$.

In a preferred embodiment, the number of iterations is four. In this embodiment, some high frequency streaks remain, indicating that the compensation is done only at low and medium frequencies.

It is noted that the shapes of the reflectance profiles are not necessarily the same for all area coverages and halftones. This implies that if the intensity settings that compensate streaks are computed for a given halftone and area coverage, this compensation does not necessarily result in proper compensation for others halftone and area coverage combinations. Moreover, nothing prevents the corrections from being worse than the uncompensated cases Therefore, the present invention provides a raster output scanning device based compensation that is "robust" over all halftones and area coverages of interest by utilizing a multi-objective control strategy. In this embodiment, the present invention may give up some of the achievable performance for each one of the halftone-area coverage combinations, in order to gain a better compensation over the whole set of halftone-area coverage combinations.

In this case, the compensation process of the present invention is changed, for example, to $U(k+1)=U(k)+K*(w1*E1(k)+w2*E2(k)+ \ldots +wh*Eh(k))$ where there are h different halftone-area coverage combinations that are to be compensated for at the same time $Ei(k)$ is the error for the strip with the $i^{th}$ halftone-area coverage combination, wi are weights that should be used as design parameters to emphasize some combinations over others. In one embodiment, wi is equal to 1 for all i, thereby resulting in just the sum of the errors of all halftone/area coverage combinations.

FIGS. 8-11 show measured reflectances for the four separations (black-FIG. 8, cyan-FIG. 9, magenta-FIG. 10, and yellow-FIG. 11) with eight area coverages for each separation wherein the above described multi-objective control has been utilized. As seen from the illustrations, the dotted lines 250 represent reflectance values rendered by uncompensated intensity settings and the solid lines 200 represent reflectance values rendered by compensated intensity settings. The multi-objective control optimized for the eight area coverages, giving roughly the same improvement over all separations.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A method for compensating for streak defects in an image formed using a raster output scanning device, comprising:
    (a) generating a reflectance profile from an image generated by the raster output scanning device, the reflectance profile being a plurality of sets of halftone reflectance values and a plurality of sets of area coverage reflectance values, each set of halftone reflectance values corresponding to a distinct halftone, each set of area coverage reflectance values corresponding to a distinct area coverage;
    (b) determining a difference profile based upon the generated reflectance profile and a uniform profile, the uniform profile being a plurality of sets of target halftone reflectance values and a plurality of sets of target area coverage reflectance values, each set of target halftone reflectance values corresponding to a distinct halftone, each set of target area coverage reflectance values corresponding to a distinct area coverage, the difference profile being a plurality of sets of difference halftone reflectance values and a plurality of sets of difference area coverage reflectance values, each set of difference halftone reflectance values corresponding to a difference between the set of halftone reflectance values and a corresponding set of target halftone reflectance values, each set of difference area coverage reflectance values corresponding to a difference between the set of area coverage reflectance values and a corresponding set of target area coverage reflectance values; and
    (c) generating a compensation parameter based on the determined difference profile, the compensation parameter representing a change in an illumination intensity setting profile, the change in an illumination intensity setting profile corresponding to a change in the illumination intensity of the illumination outputted by the raster output scanning device when the raster output scanning device is illuminating.

2. The method as claimed in claim 1, wherein the reflectance profile is generated by scanning the target pattern to generate a reflectance profile for the strip.

3. The method as claimed in claim 1, further comprising:
    (d) updating the illumination intensity setting profile in a driver for the raster output scanning device based on the generated compensation parameter.

4. The method as claimed in claim 1, further comprising:
    (d) iteratively updating the illumination intensity setting profile in a driver for the raster output scanning device based on the generated compensation parameter.

5. The method as claimed in claim 1, wherein the compensation parameter is utilized to control illumination intensity of the illumination outputted by the raster output scanning device as a function of fast-scan position across the image so as to compensate for non-uniformities.

6. The method as claimed in claim 5, wherein the illumination intensity of the illumination outputted by the raster output scanning device is controlled iteratively.

7. A system for compensating for streak defects in an image formed using a raster output scanning device, comprising:
    a scanner to generate a reflectance profile from an image generated by the raster output scanning device, said reflectance profile being a plurality of sets of halftone reflectance values and a plurality of sets of area coverage reflectance values, each set of halftone reflectance values corresponding to a distinct halftone, each set of area coverage reflectance values corresponding to a distinct area coverage; and
    a controller to determine a difference profile based upon said generated reflectance profile and a uniform profile, said uniform profile being a plurality of sets of target halftone reflectance values and a plurality of sets of target area coverage reflectance values, each set of target halftone reflectance values corresponding to a distinct halftone, each set of target area coverage reflectance values corresponding to a distinct area coverage, said difference profile being a plurality of sets of difference halftone reflectance values and a plurality of sets of difference area coverage reflectance values, each set of difference halftone reflectance values corresponding to a difference between the set of halftone reflectance values and a corresponding set of target halftone reflectance values, each set of difference area coverage reflectance values corresponding to a difference between the set of area coverage reflectance values and a corresponding set of target area coverage reflectance values;
    said controller generating a compensation parameter based on the determined difference profile, said compensation parameter representing a change in an illumination intensity setting profile, the change in an illumination intensity setting profile corresponding to a change in the illumination intensity of the illumination outputted by the raster output scanning device when the raster output scanning device is illuminating.

8. The system as claimed in claim 7, wherein said scanner generates said reflectance profile by scanning the target pattern to generate a reflectance profile for the strip.

9. The system as claimed in claim 7, wherein said controller updates the illumination intensity setting profile in a driver for the raster output scanning device based on said compensation parameter.

10. The system as claimed in claim 7, wherein said controller iteratively updates the illumination intensity setting profile in a driver for the raster output scanning device based on said compensation parameter.

11. The system as claimed in claim 7, wherein said scanner is an inline full width array sensor.

12. The system as claimed in claim 7, wherein said scanner is an offline scanner.

13. The system as claimed in claim 12, wherein said offline scanner is a flatbed scanner.

14. The system as claimed in claim 12, wherein said offline scanner is a scanning spectrophotometer.

15. The system as claimed in claim 7, wherein said controller generates said compensation parameter as a function of fast-scan position across the image so as to compensate for non-uniformities.

16. The system as claimed in claim 15, wherein said compensation parameter is changed iteratively.

17. A system for compensating for streak defects in an image formed using a raster output scanning device, comprising:

means for generating a reflectance profile from an image generated by the raster output scanning device, the reflectance profile being a plurality of sets of halftone reflectance values and a plurality of sets of area coverage reflectance values, each set of halftone reflectance values corresponding to a distinct halftone, each set of area coverage reflectance values corresponding to a distinct area coverage;

means for determining a difference profile based upon said generated reflectance profile and a uniform profile, the uniform profile being a plurality of sets of target halftone reflectance values and a plurality of sets of target area coverage reflectance values, each set of target halftone reflectance values corresponding to a distinct halftone, each set of target area coverage reflectance values corresponding to a distinct area coverage, the difference profile being a plurality of sets of difference halftone reflectance values and a plurality of sets of difference area coverage reflectance values, each set of difference halftone reflectance values corresponding to a difference between the set of halftone reflectance values and a corresponding set of target halftone reflectance values, each set of difference area coverage reflectance values corresponding to a difference between the set of area coverage reflectance values and a corresponding set of target area coverage reflectance values; and means for generating a compensation parameter based on the determined difference profile, said compensation parameter representing a change in an illumination intensity setting profile, the change in an illumination intensity setting profile corresponding to a change in the illumination intensity of the illumination outputted by the raster output scanning device when the raster output scanning device is illuminating.

18. The system as claimed in claim 17, wherein said means for generating a reflectance profile generates said reflectance profile by scanning the target pattern to generate a reflectance profile for the strip.

19. The system as claimed in claim 17, further comprising:
means for updating the illumination intensity setting profile in a driver for the raster output scanning device based on said compensation parameter.

20. The system as claimed in claim 17, further comprising:
means for iteratively updating the illumination intensity setting profile in a driver for the raster output scanning device based on said compensation parameter.

21. The system as claimed in claim 17, wherein said means for generating a reflectance profile is an inline full width array sensor.

22. The system as claimed in claim 17, wherein said means for generating a reflectance profile is an offline scanner.

* * * * *